(12) United States Patent
Cabessa et al.

(10) Patent No.: US 9,645,328 B2
(45) Date of Patent: May 9, 2017

(54) NO-POLISH OPTICAL ELEMENT ATTACHMENT FOR OPTICAL FIBER FERRULE

(71) Applicant: Compass Electro Optical Systems Ltd., Netanya (IL)

(72) Inventors: Moti Cabessa, Netanya (IL); Idan Chayun, Ramat Gan (IL)

(73) Assignee: Compass Electro Optical Systems Ltd., Netanya (IL)

( * ) Notice: Subject to any disclaimer, the term of this patent is extended or adjusted under 35 U.S.C. 154(b) by 148 days.

(21) Appl. No.: 14/526,774

(22) Filed: Oct. 29, 2014

(65) Prior Publication Data

US 2016/0124153 A1 May 5, 2016

(51) Int. Cl.
*G02B 6/32* (2006.01)
*G02B 6/38* (2006.01)
G02B 6/36 (2006.01)

(52) U.S. Cl.
CPC .............. *G02B 6/3885* (2013.01); *G02B 6/32* (2013.01); *G02B 6/3644* (2013.01); *G02B 6/3672* (2013.01); *G02B 6/3692* (2013.01); *G02B 6/3837* (2013.01); *G02B 6/3843* (2013.01)

(58) Field of Classification Search
CPC ...... G02B 6/32; G02B 6/3885; G02B 6/3644; G02B 6/3672; G02B 6/3692; G02B 6/3837; G02B 6/3843
See application file for complete search history.

(56) References Cited

U.S. PATENT DOCUMENTS

| | | | |
|---|---|---|---|
| 4,186,999 | A | 2/1980 | Harwood et al. |
| 5,123,723 | A | 6/1992 | Chesnutt et al. |
| 5,185,846 | A | 2/1993 | Basavanhally et al. |
| D449,275 | S | 10/2001 | Goto |
| 6,522,817 | B2 | 2/2003 | Moran |
| 6,609,835 | B2 | 8/2003 | Trezza et al. |
| 6,623,177 | B1 | 9/2003 | Chilton |
| 6,633,719 | B2 | 10/2003 | Basavanhally et al. |
| 6,704,483 | B2 | 3/2004 | Sherman et al. |
| 6,757,475 | B2 | 6/2004 | Sherman et al. |
| 6,766,086 | B1 | 7/2004 | Sherman et al. |
| 6,823,127 | B2 | 11/2004 | Nasiri et al. |
| D519,085 | S | 4/2006 | Gull et al. |
| 7,024,090 | B2 | 4/2006 | Jeantilus et al. |
| 7,149,400 | B2 | 12/2006 | Lange et al. |
| 7,167,618 | B2 | 1/2007 | Kobayashi et al. |

(Continued)

*Primary Examiner* — Carson Gross
(74) *Attorney, Agent, or Firm* — Wilmer Cutler Pickering Hale and Dorr LLP

(57) ABSTRACT

Systems and method for attaching optical elements to a multi-fiber ferrule. The method may include the steps of acquiring a ferrule having a plurality of holes and an output side; providing an optical element having a flat surface such that an orientation of the flat surface of the optical element is facing the output side of the ferrule within a predetermined tolerance; applying an adhesive to the flat surface of the optical element or the output side of the ferrule, the adhesive selected to match the refractive index of the optical element; moving at least one of the optical element and the ferrule with a controlled velocity and acceleration such that the flat surface of the optical element pushes against all of the protruding fibers; and curing the applied adhesive to attach the optical element to the ferrule.

6 Claims, 13 Drawing Sheets

(56) References Cited

U.S. PATENT DOCUMENTS

| | | |
|---|---|---|
| 7,521,634 B2 | 4/2009 | Clem et al. |
| 7,606,454 B2 | 10/2009 | Furusawa |
| 9,205,558 B1 | 12/2015 | Zevenbergen et al. |
| 2002/0129623 A1 | 9/2002 | Nonomura et al. |
| 2003/0007758 A1 | 1/2003 | Rose et al. |
| 2003/0063861 A1 | 4/2003 | Fouquet et al. |
| 2003/0142920 A1 | 7/2003 | Dallas et al. |
| 2011/0243504 A1* | 10/2011 | Matsui .................... G02B 6/32 385/74 |
| 2012/0027358 A1* | 2/2012 | Webb .................... G01B 11/02 385/78 |
| 2012/0106898 A1 | 5/2012 | Geron et al. |
| 2012/0145307 A1* | 6/2012 | Margolin ............. G02B 6/3885 156/72 |
| 2014/0052298 A1 | 2/2014 | Hourtash et al. |
| 2014/0195053 A1 | 7/2014 | Subotincic |
| 2015/0006395 A1 | 1/2015 | Chu |
| 2016/0062040 A1* | 3/2016 | Hodge ................. G02B 6/3855 385/80 |
| 2016/0075035 A1 | 3/2016 | Sun |
| 2016/0096643 A1 | 4/2016 | Baylor et al. |
| 2016/0101613 A1 | 4/2016 | Shih et al. |
| 2016/0124153 A1 | 5/2016 | Cabessa et al. |
| 2016/0124162 A1 | 5/2016 | Cabessa et al. |

\* cited by examiner

Fig. 3A
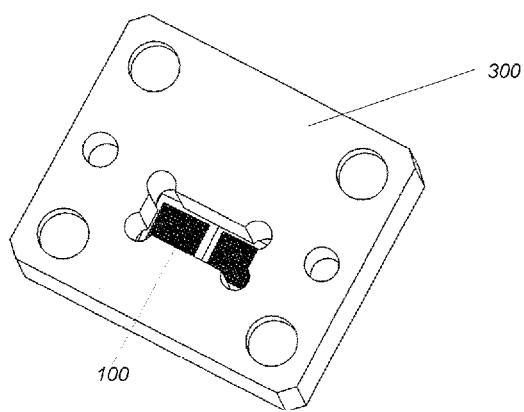
Fig. 3B
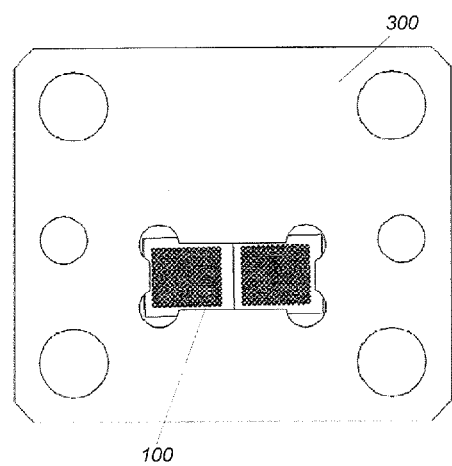
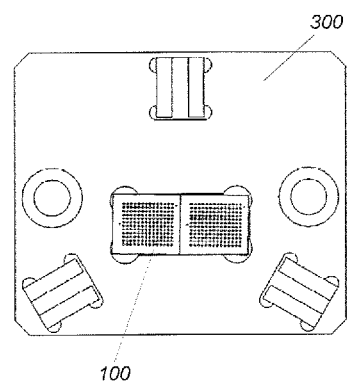
Fig. 3C

NO-POLISH OPTICAL ELEMENT ATTACHMENT FOR OPTICAL FIBER FERRULE

FIELD OF THE INVENTION

The present disclosure relates to optical fiber ferrules, and methods to automatically adhere optical elements to such ferrules.

BACKGROUND

Ferrules are used to position the ends of optical fibers for proper connection to other optical components. Certain automated processes exist to connect a single optical fiber to other components using ferrules. However, a manual process is generally utilized for forming connections of multiple optical fibers to other components using ferrules because the precision that is required to form functioning, operable connections for each and every one of the multiple optical fibers are difficult.

SUMMARY

Systems and methods for manufacturing a multi-fiber ferrule are disclosed. According to an embodiment of the present disclosure the method can include acquiring a ferrule having a plurality of holes and an output side, wherein a plurality of optical fibers extend into the plurality of holes, and wherein each of the plurality of fibers protrudes past the output side of the ferrule; providing an optical element having a flat surface such that an orientation of the flat surface of the optical element is facing the output side of the ferrule within a predetermined tolerance; applying an adhesive to the flat surface of the optical element or the output side of the ferrule, the adhesive selected to match the refractive index of the optical element; moving at least one of the optical element and the ferrule with a controlled velocity and acceleration such that the flat surface of the optical element pushes against all of the protruding fibers; and curing the applied adhesive to attach the optical element to the ferrule.

In accordance with other aspects of this embodiment, the method further includes applying an adhesive to the input side.

In accordance with other aspects of this embodiment, the method further includes applying an adhesive to the plurality of holes.

In accordance with further aspects of this embodiment, the adhesive enters the holes to surround the optical fibers by means of capillary action.

In accordance with other aspects of this embodiment, the optical element is a microlens.

While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIGS. 3A-C show a kinematic housing in accordance with embodiments of the present disclosure.

DETAILED DESCRIPTION

The present disclosure describes a process for automatically connecting multiple optical fibers using a multi-fiber ferrule. Recognized shortcomings of prior art multi-fiber ferrules are addressed.

Several sources of imprecision in conventional designs are addressed in the present disclosure. Particularly, the present disclosure includes a) the use of a flat ferrule with precisely-located holes in the form of countersunk bores, 2) the use of alignment tools such as a vacuum gripper to allow precision in lateral position without the need for computer vision, 3) connection algorithms to automatically map different fiber connections such as cross-connections, shuffles, and fan-outs for any number of optical fibers, and 4) a no-polish method for attaching optical elements to the ferrule output side. Each of these particular components will be described in detail along with their use in different methods according to the present disclosure.

Flat Multi-Fiber Ferrule and Vacuum Gripper

Figure 1:
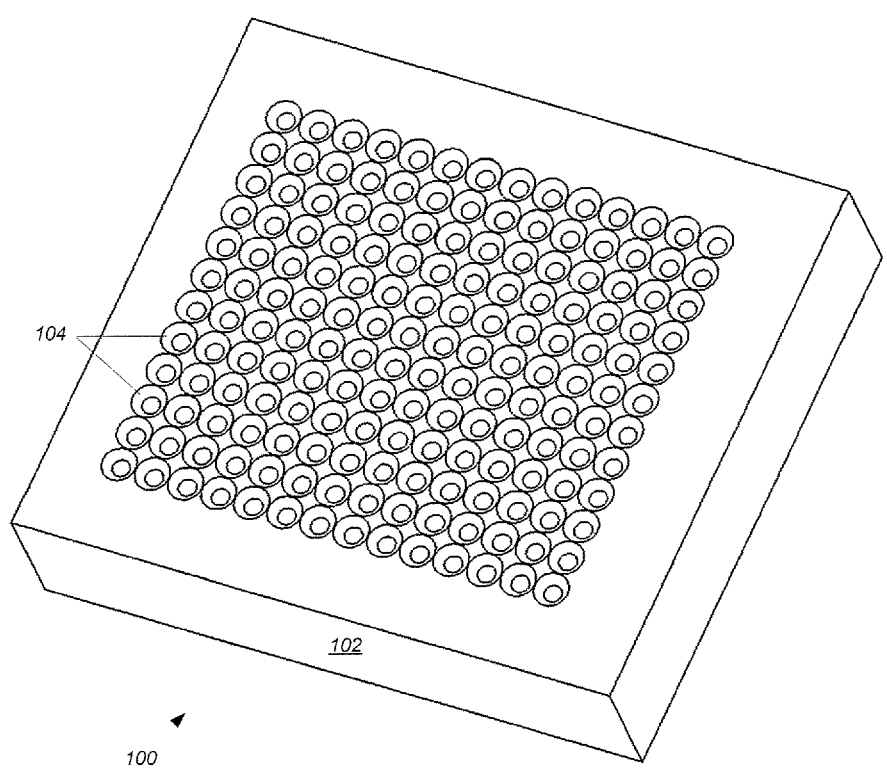
FIG. 1 shows a ferrule containing multiple holes in accordance with embodiments of the present disclosure.

FIG. 1 shows an example of a ferrule 100 which is manufactured and used in accordance with the present disclosure. Rather than the relatively imprecise injection molding common in the art, the ferrule disclosed herein may comprise a substantially thin, flat layer of material with holes that are precisely placed throughout the flat material to hold the fibers. In certain embodiments, the ferrule is less than 600 microns thick. In certain embodiments, the placement of the holes has a tolerance of 0.5 microns.

The ferrule 100 is formed from a substantially flat substrate 102, which may be a silicon wafer or other die suitable for precision etching. Holes 104 may be formed by means of a deep reactive-ion etching (DRIE) process appropriate for use on a silicon plate, or another process that allows for precise control of the position of the holes 104. Notably, the process for forming the holes may be more precise than a plastic injection molding process in which ferrules for optical fibers are typically made. In some implementations, a mechanical process such as precision tooling using a drill or other cutting head may be used.

For purposes of describing the ferrule 100 and associated manufacturing processes, the disclosure refers to an input side, an output side, and lateral and axial directions. These terms are in reference to the direction in which optical fibers will be threaded through the holes 104 in the ferrule, as further described below. The input side is the surface of the ferrule that includes the openings for the holes where the fibers are to be inserted. The output side is the opposite surface of the ferrule that includes the openings for the holes where the fibers emerge. The lateral directions are those in the same plane as the broad, flat surfaces on the input and output surfaces of the ferrule, which is generally perpendicular to the insertion direction of the fibers. The axial directions are those parallel to the direction in which the optical fibers are inserted into the ferrule.

As prior art multi-fiber ferrules often extend a long distance in the axial direction to accommodate cross-connections and other bundle shaping, an additional source of imprecision in the prior art is that a small error in fiber positioning at one end of the ferrule can be magnified along the length of the ferrule to result in a much larger error at the other end. This problem is obviated by the disclosed ferrule design which, again, may be a thin flat layer. In certain embodiments, the ferrule is less than 600 microns thick.

Figure 2A:
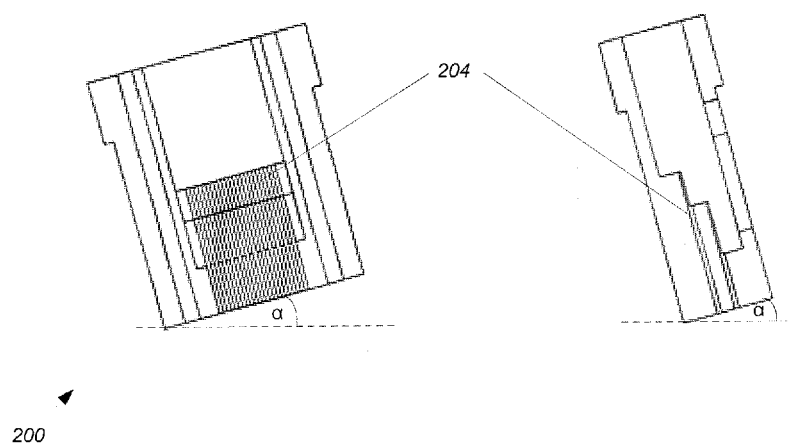
FIG. 2A illustrates a conventional ferrule.
Figure 2B:
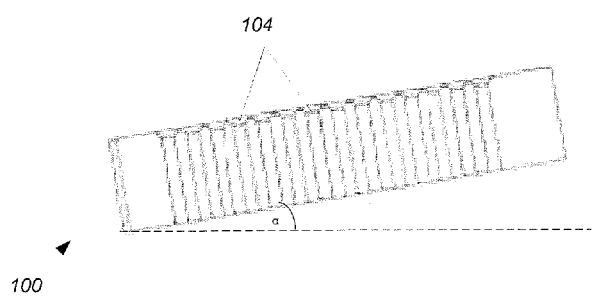
FIG. 2B illustrates a flat, thin ferrule in accordance with embodiments of the present disclosure.

This difference is illustrated by comparing a conventional ferrule 200 shown in FIG. 2A with the ferrule 100 further illustrated in FIG. 2B. As shown by the side and end views of the long ferrule 200 in FIG. 2A, the relatively long holes 204 mean that even a small tilt in the ferrule relative to the optical fiber, illustrated by the angle α, can cause a relatively large inaccuracy in the lateral position at the insertion point. In contrast, as shown in FIG. 2B, the thin flat, ferrule 100 of the present disclosure results in much less inaccuracy at the same angle α.

Further, as shown both in FIG. 1 and in FIG. 2B, the holes 104 may be countersunk bores with widened, conical openings on the input side of the ferrule 100. The conical openings on the input side may provide additional guidance when inserting the optical fibers. In some implementations, the entire length of the holes 104 may be shaped as a truncated cone. In some implementations, the remainder of the holes 104 may be cylindrical without any additional widening on the output side. In comparison to conventional ferrules, such as ferrule 200 shown in FIG. 2A that has no such widened opening as a guiding feature, this further provides tolerances for minor errors in alignment between an optical fiber and its hole 104.

As shown in FIGS. 3A-C, to further aid in alignment during the optical fiber connection process, the ferrule 100 may be enclosed in a housing 300 which may act as an additional alignment element. In some implementations, the housing 300 may represent a "kinematic mount," which has a precisely fitted recess for correct lateral positioning of the ferrule 100. FIG. 3A is a perspective view illustrating the housing 300 with the ferrule 100 properly mounted thereon. FIGS. 3B and 3C are front and rear views, respectively, of the ferrule 100 mounted within the housing 300.

Figure 4:
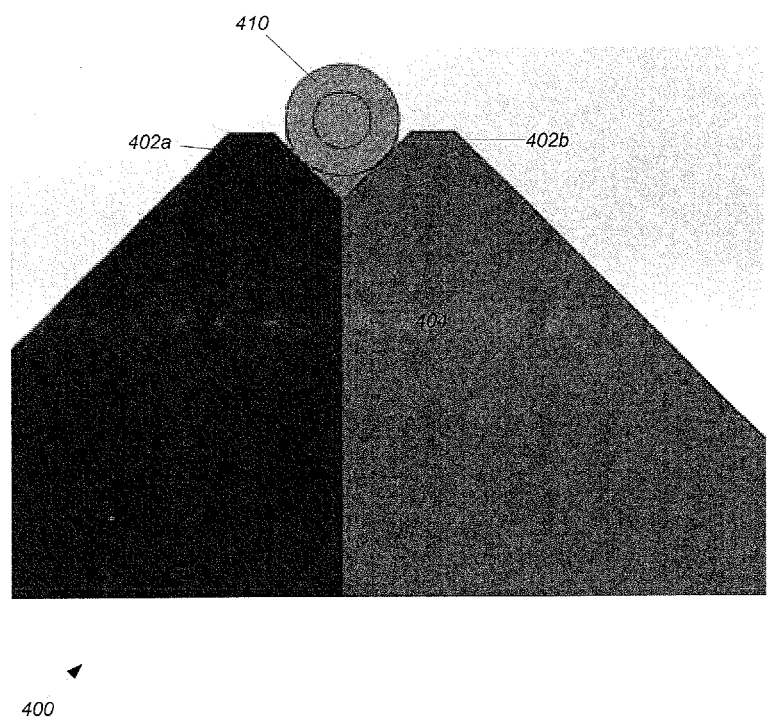
FIG. 4 shows a vacuum gripper in accordance with embodiments of the present disclosure.

For inserting each optical fiber in the ferrule, a v-groove vacuum gripper 400 such as the one shown in FIG. 4 may be used. The vacuum gripper 400 has first and second gripper surfaces 402a, 402b on either side of a seam 404. The seam 404 is in fluid communication with a vacuum source (not shown), which provides sufficient suction to hold the optical fiber 410 against the gripper surfaces 402a, 402b. The vacuum gripper can be in a fixed position along X and Y axes, relative to the position of a camera used to monitor the insertion. However, the vacuum gripper may have a degree of freedom in the Z axis.

The suction along the length of the seam 404 holds the optical fiber 410 so that its axial length is generally parallel to the seam 404. The suction toward the seam 404 in conjunction with the positions of the first and second gripper surfaces 402a, 402b determine the lateral position of the optical fiber 410.

The insertion itself can be carried out blind, meaning that while the fiber 410 is being physically inserted into the hole 104, there is no axially-directed camera view of the fiber 410 going into the hole. The lateral position of the fiber 410 can be precisely known in relation to the gripper 400. By precisely controlling the position of the gripper 400, the lateral position of the fiber 410 relative to the holes 104 in ferrule 100 and other components of the system can be determined. This provides the necessary precision, in conjunction with the precise position of the ferrule holes 104, to allow for blind insertion of the optical fiber into the appropriate ferrule holes 104.

Figure 5:
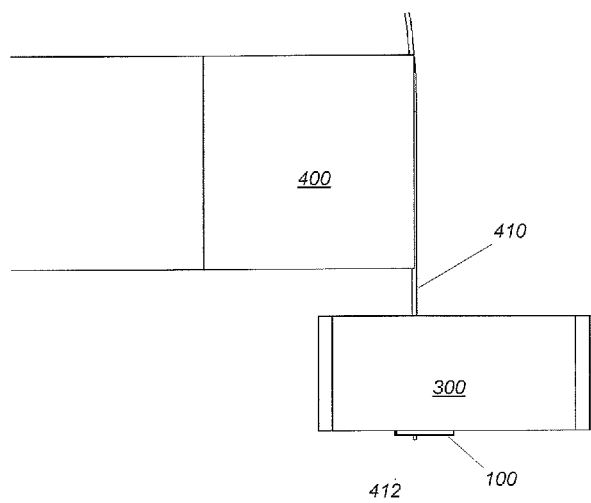
FIG. 5 illustrates aligned insertion of an optical fiber into a ferrule using a vacuum gripper in accordance with embodiments of the present disclosure.

FIG. 5 is a side view of the vacuum gripper 400 inserting the optical fiber 410 into a hole 104 in the ferrule 100, held within the housing 300. In some implementations, the perspective shown in FIG. 5 may be the same as the perspective for a camera used to monitor the insertion. Computer vision may be used to detect a length 412 of the end of the optical fiber extending past the output side of the ferrule 100. Accordingly, it can be automatically determined how far axially to insert the fiber 410 through the ferrule 100.

In some implementations, lateral position and alignment of the fiber 410 occurs based on prior calculations without live feedback from computer vision, while computer vision can be used to determine the appropriate axial position and insertion amount of the optical fibers. For example, prior to insertion, computer vision can be used to determine the lateral position of a target ferrule hole 104 (see FIG. 1) relative to the housing 300 with a precision of +/−500 microns. This can involve identifying the location of the hole matrix (X, Y location and rotation of the matrix $\theta_z$). By relying on the high-precision manufacturing tolerances of the ferrule 100 itself, the system can calculate locations for all of the holes after precisely identifying the locations of a small number of holes, such as one, two, three or five holes. For example, the lateral X and Y locations for two holes can be taken while one of the reference holes is in the center of the field of view of the camera as determined by image processing. Identifying only these two location allows calculation of the angle $\theta_z$ of rotation for the hole matrix relative to the X axis and the location of each of the holes in the matrix. As a particular example, the target ferrule hole 104 may be determined to be at a lateral position of (1000, 1000) measured as microns from origin points along X and Y axes.

Furthermore, the lateral position of the end of the fiber 410 (the end nearest the housing 300) relative to the gripper 400, may also be determined by computer vision prior to insertion. Carrying forward the earlier particular example, the gripper may be brought to the center of the camera's field of vision so that the optical surface of the fiber end can be seen. The fiber end can then be identified as being at position (100, 10) measured as microns from the gripper itself along the X and Y axes (which may represent a slight curvature to the fiber in the X direction).

This step may be carried in some embodiments to alleviate the internal stress placed on the flexible optical fiber during the manufacturing process. For example, when a segment of fiber is cut from a roll, the fiber may be bent rather than straight. Because any two lengths of optical fiber may have their optical surfaces in different locations relative to the point at which the fiber is gripped, this step can determine the relative positioning and allow for such bending. It will be understood that, in some implementations of the manufacturing process, the bend in the optical fiber will often be minimal enough that the chamfers in the guide holes would still allow insertion even without correction. However, in at least some implementations, this corrective step can be provided as part of each alignment step even though it may sometimes not be necessary.

During insertion, the camera can be pointed transverse to the axial direction and can track the movement of the end of the fiber 410 relative to the ferrule 100 in the axial direction, while the lateral alignment is carried out blind by controlling the position of the gripper 400 and the housing 300. The axial position of the end of the fiber can be tracked and controlled with high precision, in some implementations within 5 microns or less, so that the end of the fiber 410 is correctly positioned relative to the ferrule 100 for optical polishing and/or attachment of an optical element. Carrying forward the earlier particular example, the gripper's lateral position can be controlled to be at (900, 990) along the X and Y axes in accordance with the vision-assisted calculations made earlier (but, in some implementations, without a camera view showing the lateral position during insertion).

Figure 6A:
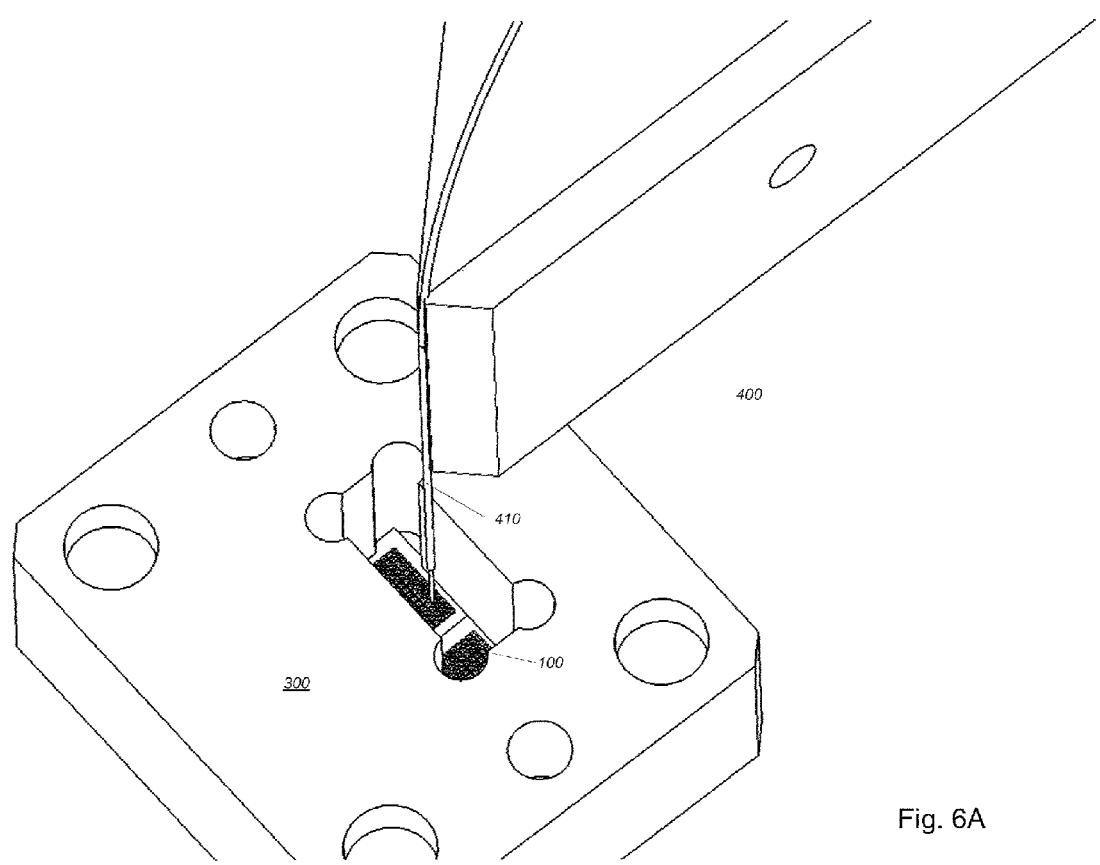
FIGS. 6A-B are further views of the aligned insertion of an optical fiber into a ferrule using a vacuum gripper in accordance with embodiments of the present disclosure.
Figure 6B:
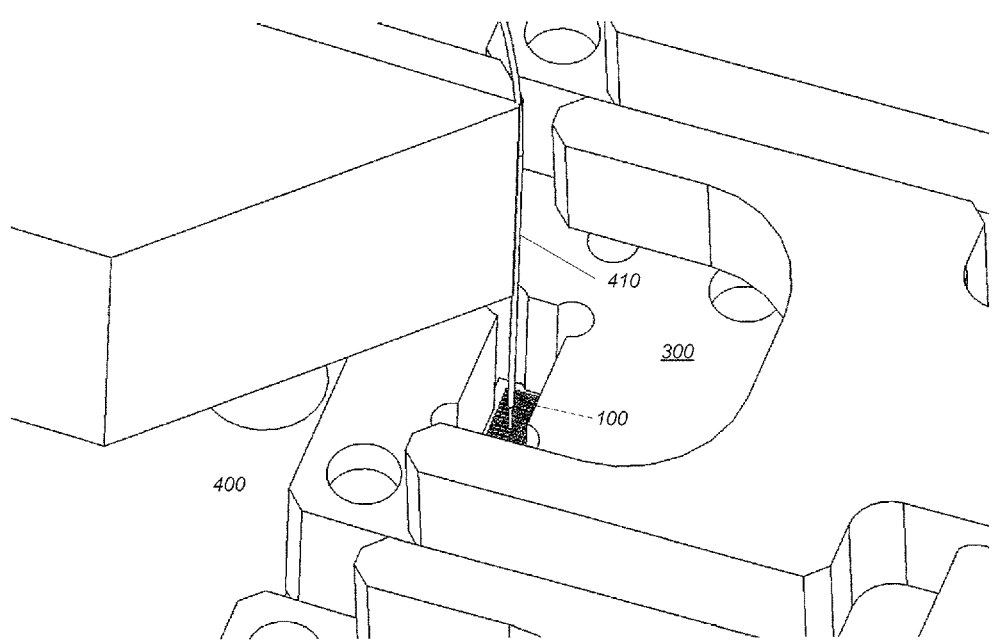

FIGS. 6A and 6B are perspective views of the vacuum gripper 400 inserting the optical fiber 410 into a hole in the ferrule 100 within the housing 300. Although the housing 300 is shown in these figures, it will be understood that other alignment mechanisms may be used to align the ferrule 100 and the gripper 400 other than a kinematic housing 300. For example, affirmative alignment guides or pins may be used for alignment.

Automatically Configuring Multi-Fiber Cross-Connections

Optical fibers may be cross-connected in a variety of ways between communication nodes. Various examples of the ways that groups of optical fibers may connect between systems include fan-outs, shuffles, and bundles—each of these referring to the way in which the cables must be arranged along their length in order to fit within the correct interfaces at either end. A "fan out" is a configuration in which fibers running together spread out to different destinations. A "shuffle" is a configuration where fibers are required to cross over each other because the connections at one end are different than connections at the other. A "bundle" is a group of fibers that stay in proximity through a cross-connection.

Typically, these cross-connections are manually configured, because the three-dimensional interaction between fibers can be difficult to properly configure within the traditional long ferrules. However, the present disclosure allows for automated assembly of virtually any configuration of fibers by the selection of holes within flat ferrules.

Figure 7:
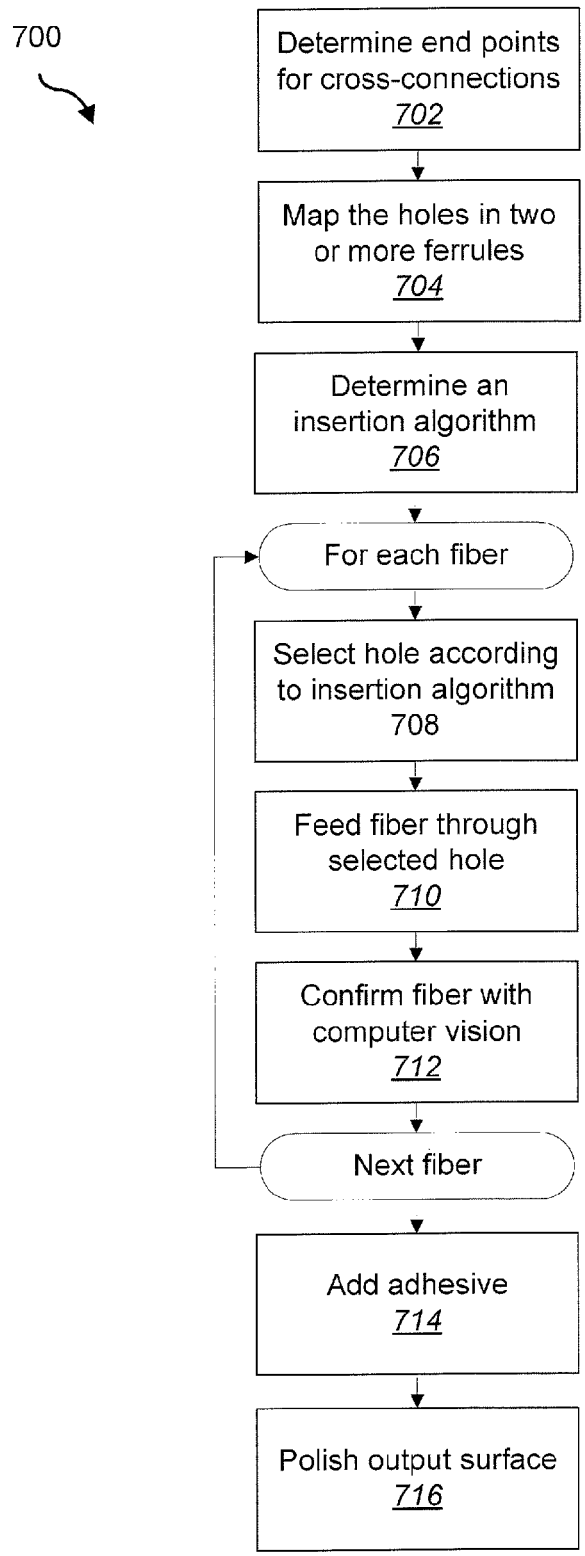
FIG. 7 shows an exemplary method for automatically for forming a multiple optical fibers cross-connection in accordance with embodiments of the present disclosure.

FIG. 7 is a flow chart illustrating an automated method 700 for establishing a multi-fiber optical cross-connection in accordance with some implementations of the present disclosure.

The available end points between the two or more communication nodes comprising the cross connection are determined (702). Typically, determining the necessary connections is a part of a user-specified communications configuration; that is, the nature of the communication system as configured by the user will determine what connections are needed between what devices. In light of the required connections, the system determines which particular element sending or receiving an optical signal needs to be connected to which other element.

The system then maps the available holes in two or more ferrules (704). In some implementations, the holes are mapped to correspond to proximate optical connections, with particular holes being associated with particular connections.

The number and positions of the holes may be confirmed by computer vision, but in some implementations may be established by means of controlling the lateral position of the ferrules themselves when the positions of the holes relative to the ferrules are already known.

The system identifies the desired cross-connection configuration and, based on the available holes, determines an insertion algorithm (706). The insertion algorithm identifies an order for inserting the optical fibers into holes in the ferrule which will best facilitate whatever shuffling, fanning out, bundling, and/or other configurations are necessary for the cross-connection. The relative position of end connections for the fibers (determined in step 702) may be used to help create the insertion algorithm.

It will be understood that the resulting algorithm may not necessarily minimize cross-over points between fibers, fiber length used, or any other particular factor. Some embodiments may include these optimization features, while in other implementations the algorithm may simply identify the first workable configuration.

A hole is then selected for the first fiber to be connected (708). Once the hole is selected for an optical fiber according to the insertion algorithm, the fiber is automatically inserted into the hole (710). The alignment and insertion process may be carried out between an optical fiber being manipulated by a vacuum gripper, and a ferrule being held in a housing or otherwise assisted by alignment guides, as described above. In some implementations, the alignment process may be generally blind (that is, without immediate verification by any computer vision elements). As explained above, factors contributing to the accurate alignment of the fiber with the ferrule in the absence of computer vision monitoring may include the accurate placement of the holes in the ferrule, the wider guiding conical shape of the hole on the input side, and the precise lateral position of the fiber by the vacuum gripper.

In some implementations, the presence of fibers crossing other fibers in the cross-connection may require that the vacuum gripper maintains a certain axial distance from the ferrule until it is aligned with the selected hole, so that it does not collide with any other fibers. The insertion algorithm may take into account the motions of the vacuum gripper when determining which holes to use for which optical fibers and in what order to insert them.

Computer vision may then be used to confirm that the fiber is properly inserted in the hole (712). In some implementations, the camera capturing images of the insertion may be positioned at the side, perpendicular to the direction of insertion, similar to the view shown in FIG. 4. The computer vision determines the presence or absence of the fiber protruding from the exit end. In some implementations, computer vision may be used to determine the extent of the exit protrusion and to assure that the length of the protrusion is proper for polishing, attaching optical elements, or any other further step of ferrule manufacture.

As illustrated in FIG. 7, the hole selection, fiber insertion, and computer vision confirmation steps may be carried out for each of a plurality of optical fibers in sequence. The steps may be carried out for each end of each optical fiber in order to form a cross-connection according to the insertion algorithm.

Once each of the fibers has been threaded into the ferrule holes, in some implementations as illustrated in FIG. 7, an adhesive may be added (714). The adhesive may be added from either end and may be selected such that it, e.g., by means of capillary action, extends along the length of each ferrule hole around the fiber to cement the fiber in the hole. In some implementations, the optical properties of the adhesive may not be particularly relevant if its application does not extend to the end of the fiber. In some implementations, an adhesive with optical properties generally matching that of the optical fibers may be used on the output end so as not to interfere with optical signal transmission along the fibers. For example, the adhesive may have a refractive index that is matched to the refractive index of the optical fibers or the optical fibers' cladding material. The adhesive may be a light-curable fiber optical assembly adhesive, such as OP-4-20632 available from DYMAX (R).

A polishing step may then be applied to the output end of each ferrule (116). The polishing process may, in some implementations, involve grinding the fiber end with differing grades of grit (five to seven grades, for example, each finer than the last). The grinding action on the surface of the ferrule assures a smooth, level surface in which the ends of the optical fibers are flush with the level of the ferrule. The surface of the ferrule itself may be subject to some of the grinding and therefore may be nominally reduced in width by the polishing step. Polishing in this way assures that the output end of the ferrule is straight with no variations to impede optical connection.

Figure 8A:
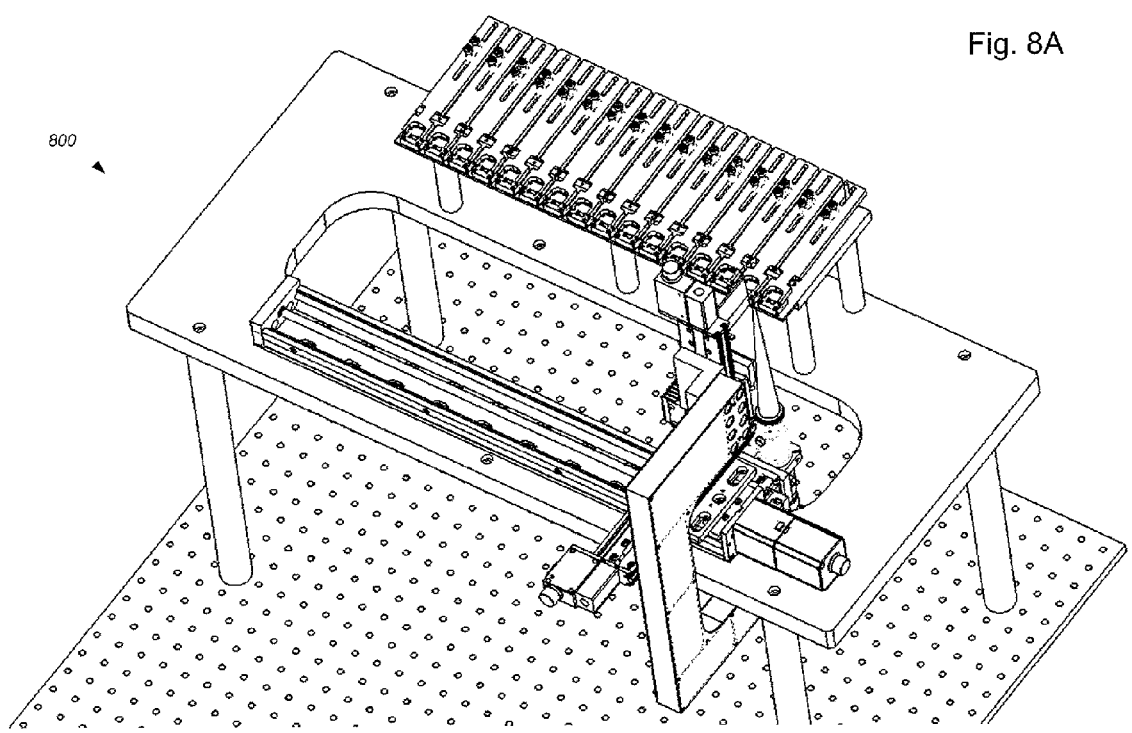
FIGS. 8A and 8B show a robot for automatically forming a multiple optical fibers cross-connection in accordance with embodiments of the present disclosure.
Figure 8B:
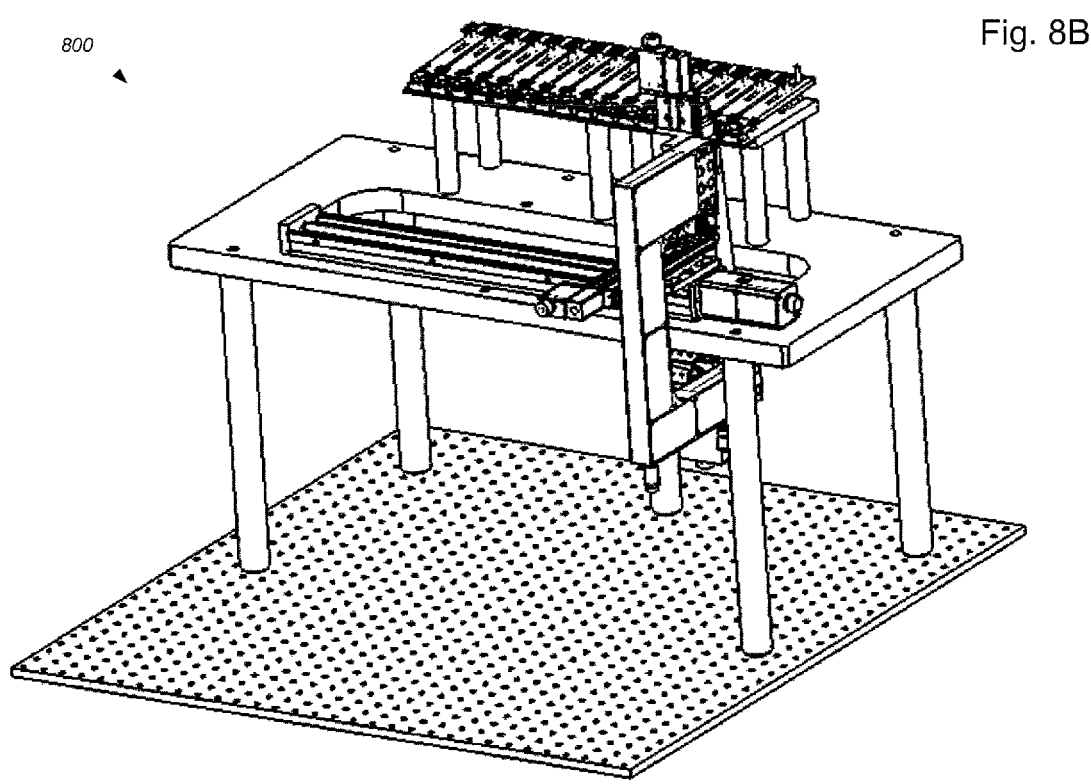

FIGS. 8A and 8B show a robot 800 with a variety of features to facilitate processes of the present disclosure including: a computer (not shown), a computer controlled XYZ platform, a vacuum gripper, an automatic glue injector, an automatic fiber feeding mechanism, automatic micro lens attachment and alignment, and machine vision for accurate assembly and inspection. In some implementations, methods disclosed herein may be carried out automatically by a manufacturing system such as the robot 800.

No-polish Attachment of Optical Elements

Figure 9:
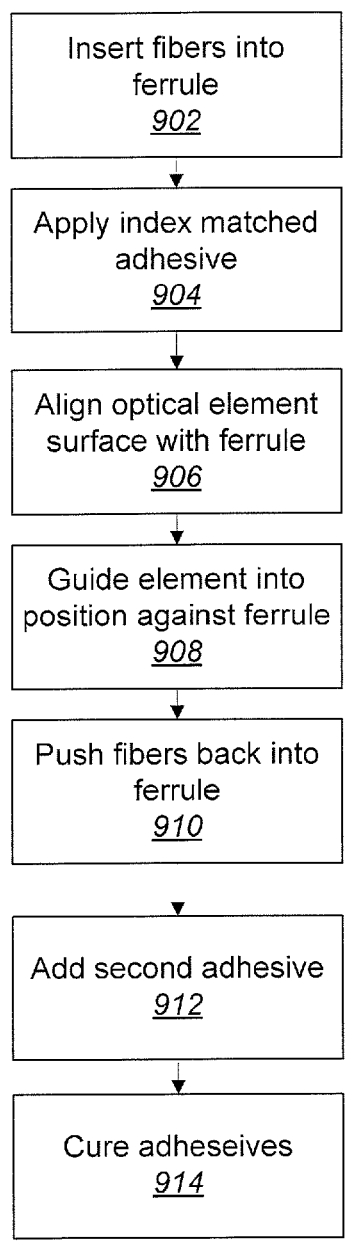
FIG. 9 shows an exemplary method for applying an optical element to a multi-fiber ferrule in accordance with embodiments of the present disclosure.

FIG. 9 illustrates a method 900 for an alternative to the polishing step 716 which, as described above, can be applied to the output surface of an optical fiber ferrule. In this alternative method, optical elements can be applied to the output surface without a polishing step.

The no-polish attachment method occurs after all the fibers have been inserted into the ferrule (902 in FIG. 9 or before 714 in FIG. 7). As described above, a set length of fiber may protrude on the output end for each of the optical fibers; this assures that the fibers will properly abut the optical element once attachment is made.

In this alternative method, rather than applying an adhesive to the ferrule as discussed in FIG. 7, an index-matched adhesive is applied to a flat surface of the optical element (904). This adhesive may be selected such that, once cured, it matches the refractive index of the optical fibers; in some embodiments it may match the optical element instead. The adhesive may be dispensed onto the surface of the optical element such that once the optical element is brought into contact with the ferrule containing the optical fibers, the adhesive contacts the fiber ends.

The optical element is aligned precisely with the output surface of the ferrule (906). Here, the system may require precision in the three-dimensional orientation of both the ferrule and the optical element so that the planes representing the output surface of the ferrule and the contacting surface of the optical element may be directed to be precisely parallel. In some implementations, the optical element may be held parallel to the ferrule at a distance chosen to avoid premature contact between the optical element and the fiber lengths. The system may be configured to a precision which matches the necessary tolerance for each optical element. In some implementations, the system may be precise to within a 10-50 micron tolerance for optical lenses and up to a 500 micron tolerance for other elements.

Once they are aligned, the optical element is moved toward the ferrule output surface at a controlled speed (908). The speed is designed to have the desired effect on the fiber ends in pushing them back into the ferrule holes and not inadvertently deform or bend the fiber ends as could otherwise occur. Although this is described in terms of movement of the optical element, it is to be understood that the movement portion is relative and that, in some implementations, the ferrule may be moved instead of or in addition to the optical element.

By means of the well-aligned, carefully-controlled movement, the surface of the optical element contacts the ends of the fibers and pushes the fibers back into the ferrule holes (910). In some implementations, the optical element may continue to push until it solidly contacts the output surface of the ferrule. The fiber ends may also be put in contact with the index-matched adhesive during this step.

A second adhesive can be added (912). This adhesive may, in some implementations, be added on the input end and designed to proceed into the holes around the optical fibers by means of capillary action until the second adhesive contacts the index-matched adhesive at the output surface. In some implementations, the second adhesive may be chosen for its mechanical properties and/or relative cost and not for its refractive index, as the second adhesive is not applied at an interface where an optical signal is expected to be transferred. Epoxies, such as EPO-TEK brand specialty epoxy, (e.g., the 301 or 353ND products) can be used as the second adhesive. In some implementations, the second adhesive may represent a second application of the first adhesive.

Once the components are positioned and the adhesives applied, one or more curing steps may be undertaken in order to cure the adhesive (914). Depending on the adhesive used, curing steps may include the application of electromagnetic radiation in certain frequencies, such as UV, infrared, or visible light.

Figure 10:
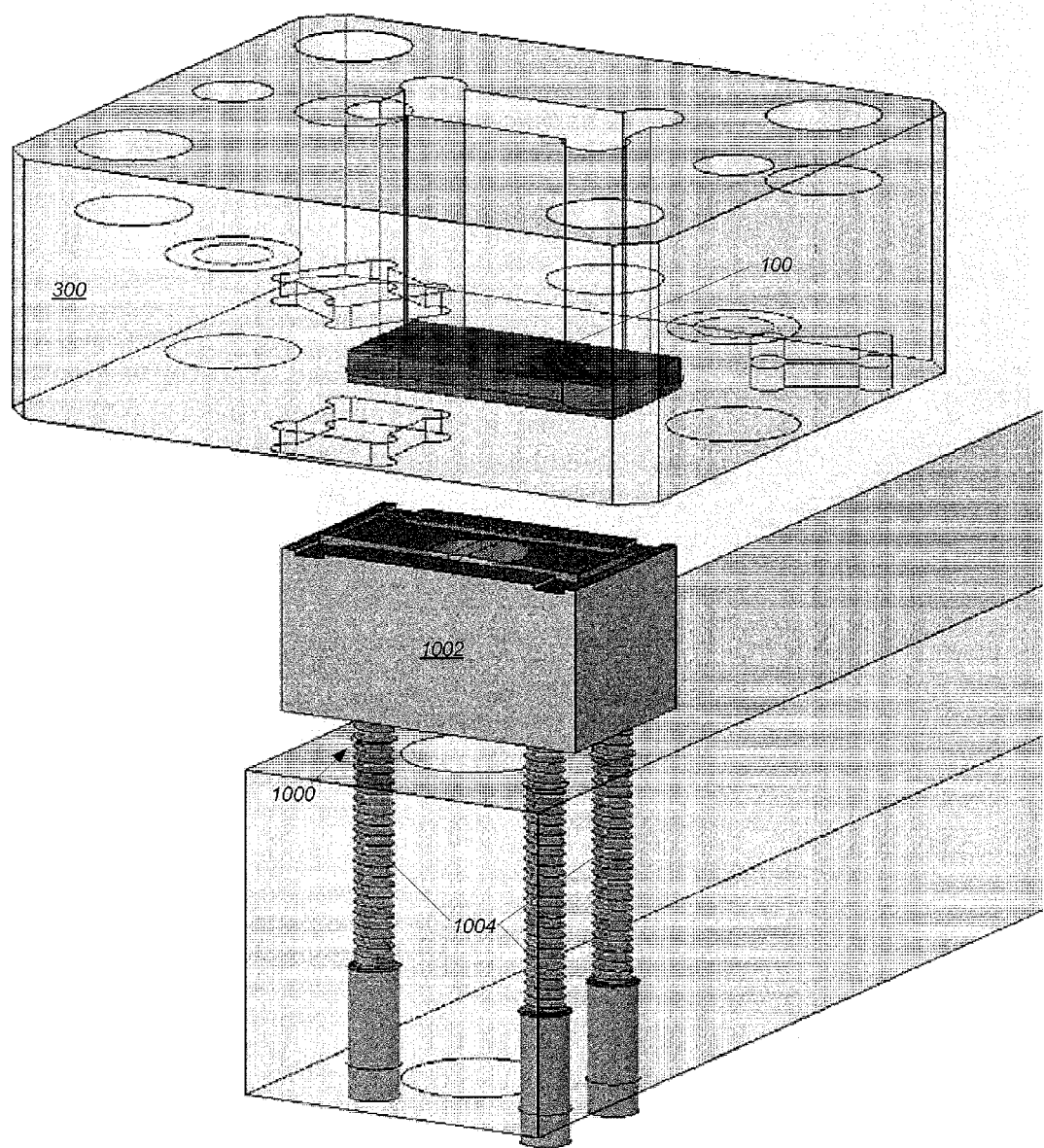
FIG. 10 shows an optical element alignment device in accordance with embodiments of the present disclosure.

FIG. 10 illustrates an alignment mechanism 1000 for applying an optical element to a ferrule 100 disposed in a housing 300. Both the alignment mechanism 1000 and the housing 300 aid in precisely positioning and orienting the components so that a clean optical connection can be made without the need for polishing the ferrule. The alignment mechanism 1000 includes a holding platform 1002 for the optical element and three compression springs 1004 each of which has a precise known position relative to optical element on the holding platform 1002. The compression of each of the three springs 1004 is individually actuated, providing one degree of translational freedom in the axial direction and two degrees of angular freedom. Thus, alignment mechanism 1000 allows the optical element to be angled and positioned precisely for proper application to the ferrule without polishing.

At this point it should be noted that automated manufacturing in accordance with the present disclosure as described above can involve the processing of input data and the generation of output data to some extent. This input data processing and output data generation can be implemented in hardware or software. For example, specific electronic components can be employed in a device controller or similar or related circuitry for implementing the functions associated with automated manufacturing in accordance with the present disclosure as described above. Each particular controller may control the position and actuation of a particular device carrying out one or more of the steps of the invention; for example, a controller for a vacuum gripper as described herein may control the position of the gripper and the activation of a vacuum pump associated with the gripper. In some implementations, multiple controllers may be associated with a single device; in some implementations, a single controller may be associated with multiple devices.

Alternatively, one or more processors operating in accordance with instructions can implement the functions associated with automated manufacturing in accordance with the present disclosure as described above. If such is the case, it is within the scope of the present disclosure that such instructions can be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. For example, potentially any configuration of cables could benefit from the techniques disclosed herein. Thus, such other embodiments and modifications are intended to fall within the scope of the present disclosure. Further, although the present disclosure has been presented herein in the context of at least one particular implementation in at least one particular environment for at least one particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

What is claimed is:

1. A method for mounting an optical element to a ferrule, comprising:
    acquiring a ferrule having a plurality of holes and an output side;
    inserting a plurality of optical fibers into the plurality of holes so that an end of each of the plurality of fibers protrudes past the output side of the ferrule;
    providing an optical element having a flat surface;
    applying an adhesive to the flat surface of the optical element or the output side of the ferrule, the adhesive selected to match the refractive index of the optical element;
    moving at least one of the optical element and the ferrule with a controlled velocity such that the flat surface of the optical element pushes all of the protruding fibers back into their corresponding holes until the flat surface of the optical element contacts the output side of the ferrule; and
    curing the applied adhesive to attach the optical element to the ferrule.

2. The method of claim 1, further comprising:
    applying an adhesive to the output side.

3. The method of claim 1, further comprising:
    applying an adhesive to the plurality of holes.

4. The method of claim 3, wherein the adhesive applied to the plurality of holes enters the holes to surround the optical fibers by means of capillary action.

5. The method of claim 1, wherein the optical element is a microlens.

6. The method of claim 1, further comprising using computer vision to determine a length of protrusion past the output side of the ferrule for each of the plurality of optical fibers.

* * * * *